United States Patent
Tregub et al.

[19]

[11] Patent Number: 6,099,631
[45] Date of Patent: Aug. 8, 2000

[54] INK DEVELOPMENT PROCESSES FOR THE PREPARATION OF PIGMENTED SOLID INKS

[75] Inventors: Inna Tregub, Oak Park; Zahra Fathollahi, Northridge, both of Calif.

[73] Assignee: Hitachi Koki Imaging Solutions, Inc., Simi Valley, Calif.

[21] Appl. No.: 09/025,875

[22] Filed: Feb. 19, 1998

[51] Int. Cl.[7] .................................................. C09D 11/02
[52] U.S. Cl. ................. 106/31.85; 106/31.6; 106/31.61; 106/31.62; 106/31.63; 106/31.88
[58] Field of Search ............. 106/31.61, 31.62, 106/31.63, 31.6, 31.85, 31.88

[56] References Cited

U.S. PATENT DOCUMENTS

| | | | |
|---|---|---|---|
| 2,999,762 | 9/1961 | Verdier | 106/427 |
| 5,207,825 | 5/1993 | Schwarz, Jr. | 106/31.29 |
| 5,350,446 | 9/1994 | Lin et al. | |
| 5,531,819 | 7/1996 | Sawada | 524/114 |
| 5,592,204 | 1/1997 | Lin et al. | 347/88 |
| 5,593,486 | 1/1997 | Oliver et al. | 524/96 |
| 5,662,736 | 9/1997 | Sakai et al. | 106/31.29 |
| 5,667,568 | 9/1997 | Sacripante et al. | 106/31.29 |
| 5,800,600 | 9/1998 | Lima-Marques et al. | 106/31.29 |
| 5,863,319 | 1/1999 | Baker et al. | 106/31.29 |

FOREIGN PATENT DOCUMENTS

| | | |
|---|---|---|
| 08197 | 1/1998 | European Pat. Off. . |
| 2 079 228 | 11/1971 | France . |
| 538 592 | 8/1941 | United Kingdom . |

OTHER PUBLICATIONS

Database WPI, Section Ch, Week 8301, Derwent Publications Ltd., London, GB; AN 83–01550K, XP002104509 & JP 51 087536 A (Toyo Ink Mfg. Co.), Jul. 31, 1976 (Abstract).

*Primary Examiner*—Helene Klemanski
*Attorney, Agent, or Firm*—Pillsbury Madison & Sutro LLP

[57] ABSTRACT

An ink development process for the preparation of pigmented solid inks including the steps of preparing a mill base and preparing an ink from the mill base. The mill base contains a pigment, and a solvent or oil as a wetting and dispersing media for the pigment. The mill base may contain a plasticizer. A hot melt pigmented ink is also provided.

42 Claims, 11 Drawing Sheets

MAGENTA

CYAN

321.1 x 350

YELLOW 319.1 x 350

INK DEVELOPMENT PROCESSES FOR THE PREPARATION OF PIGMENTED SOLID INKS

BACKGROUND OF THE INVENTION

1. Area of the Art

The invention relates to an ink development process, and particularly to an ink development process for the preparation of a pigmented ink.

2. Description of the Prior Art

The development of large format printing puts additional requirements on printing inks, such as exceptional durability and light fastness. To meet these requirements, conventional dyes are being replaced by the more heat and light resistant pigments such as quinacridones, phthalocyanines, and the like. These pigments are difficult to disperse. Preparation of good thermally stable dispersions with submicron particles is particularly difficult in the case of hot melt inks made on the basis of waxes. It requires longer milling time and powerful mills.

Usually the preparation of pigmented solid inks includes the milling of pigments in waxes in the presence of dispersing agents. This process is time and energy consuming and requires elaborate modem milling equipment. The resulting dispersion is often not stable, and an additional operation such as agitating the ink by shaking the printhead is needed to maintain good dispersion.

Therefore, a need exists to improve the milling process for obtaining a better pigment dispersion in a shorter time using relatively simple milling equipment.

SUMMARY OF THE INVENTION

It is an object of the present invention to simplify milling processes for the preparation of pigmented solid inks, particularly, to provide a milling process for obtaining better pigment dispersion in a shorter time using relatively simple milling equipment. In addition, it is an object of the present invention to provide a hot melt pigmented ink with a better and more stable pigment dispersion.

These and other objects and advantages are achieved by the inks and ink development processes in accordance with embodiments of the present invention. In accordance with the process embodiments of the present invention, an ink development process for the preparation of pigmented solid inks includes the steps of preparing a mill base and preparing an ink from the mill base. The mill base contains a pigment and solvent, such as a liquid organic solvent or oil as a wetting and dispersing media for the pigment. In particular embodiments the mill base can also contain a plasticizer, and a solvent as a wetting and dispersing media for the pigment.

Such an arrangement has been found to provide a number of advantages. As explained in greater detail below, it has been found that the methods in accordance with embodiments of the present invention enhance the marketability of hot melt pigmented inks in many aspects. First, the methods in accordance with embodiments of the present invention decrease the time of milling. In addition, inks made in accordance with embodiments of the present invention tend to exhibit good stability, excellent light fastness, as well as possessing reliable printing and jetting properties.

The methods in accordance with embodiments of the present invention are well suited for use in making pigmented solid inks, particularly hot melt pigmented inks. In accordance with the process embodiments of the present invention, the milling of pigments is performed in the presence of a solvent, such as a liquid organic solvent or an oil, which performs as a good wetting and dispersing media. Hot-melt phase characteristics are added in at a later stage. Also in particular embodiments, conventional waxes may be partially replaced with plasticizers to increase the stability and reduce the viscosity of pigment dispersions.

Other features and advantages of the invention will become more apparent from the following detailed description, taken in conjunction with the accompanying drawings which illustrate, by way of example, various features of embodiments of the invention.

DESCRIPTION OF THE FIGURES

The above-mentioned and other features of this invention and the manner of obtaining them will become more apparent, and will be best understood by reference to the following description, taken in conjunction with the accompanying drawings. These drawings depict only a typical embodiment of the invention and do not therefore limit its scope. They serve to add specificity and detail, in which:

FIG. 2(*a*) shows magenta (pigment red 122 based) ink (corresponding to table 2.1).

FIG. 2(*b*) shows yellow (pigment yellow 155 based) ink (corresponding to table 2.3). FIG. 2(*c*) shows cyan (pigment blue 15:4 based) ink (corresponding to table 2.2). FIG. 2(*d*) shows magenta (pigment red 122 based) ink (corresponding to table 2.5). FIG. 2(*e*) shows cyan (pigment blue 15:4 based) ink (corresponding to table 2.4). FIG. 2(*f*) shows yellow (pigment yellow 155 based) ink (corresponding to table 2.6).

FIG. 3(*a*) corresponds to table 2.1 and FIG. 3(*b*) corresponds to table 2.5.

FIG. 4(*a*) corresponds to magenta (pigment red 122 based) ink. FIG. 4(*b*) corresponds to cyan (pigment blue 15:4 based) ink. FIG. 4(*c*) corresponds to yellow (pigment yellow 155 based) ink.

FIG. 5 shows the behavior of magenta (pigment red 122 based) ink (corresponding to table 2.1) during irradiation.

DETAILED DESCRIPTION OF THE INVENTION

Figure 1:
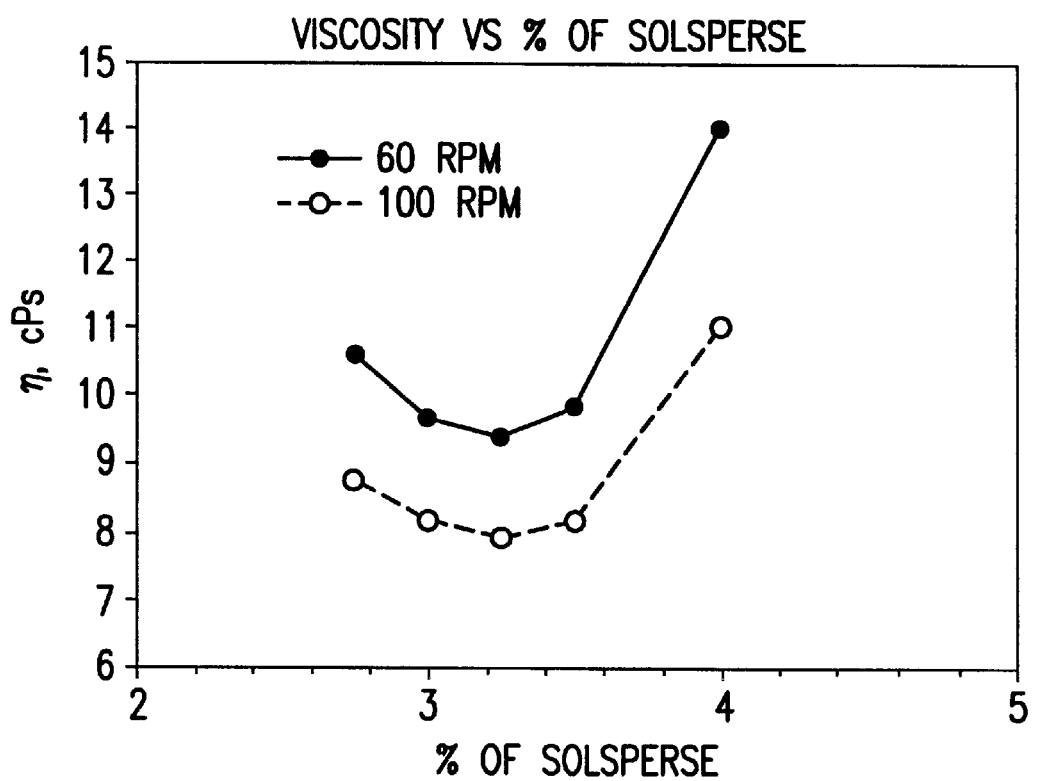
FIG. 1 shows dependence of viscosity of ink based on dispersant concentration.

Embodiments of the present invention provide a novel ink development process for the preparation of pigmented solid inks. A process in accordance with embodiments of the present invention include the steps of preparing a mill base and preparing an ink from the mill base. The mill base contains a pigment, a liquid organic solvent or an oil as a wetting and dispersing media for the pigment. It may also contain a plasticizer. In further embodiments, more than one organic solvent and oil may be used, or a combination of oils and organic solvents or the like may be used.

In one embodiment of the present invention, a mill base prepared in accordance with the present invention includes a plasticizer and conventional liquid ink ingredients, such as but not limited to, a pigment, a liquid organic solvent or oil, a dispersing agent, and in some cases a synergist. In some cases oil may be used in a sense of liquid organic solvent. In certain cases, depending on the pigment and solvent, a plasticizer may not be required.

In particular embodiments, the plasticizer may be glyceryl tribenzoate. In alternate embodiments, other plasticizers that may be used are: benzoates (including 1,4-cyclohexane dimethanol dibenzoate (Benzoflex 352), neopentyl glycole dibenzoate (Benzoflex 312), 2,2,4-trimethyl-1,3-pentanediol benzoate (Benzoflex 354), phosphates (including triphenyl phosphate), phthalates, sebacates, abietates and the like. Preferably, a mill base comprises about 0 to 40% of plasticizer by weight. The range was suggested according to the experimental results. It was found that in the case of aromatic and aliphatic solvents, alcohols and glycols, thermal stability of the final ink dispersion was better when a plasticizer was present in the mill base.

For the purpose of embodiments of the present invention, a pigment may be either an organic or an inorganic pigment. Preferably, the pigments are heat and light resistant. Examples of possible pigments include, but are not limited to, pigment blues (PB) 15, 15:3, 15:4, 16, 22, 28, 64, 68; pigment reds (PR) 3, 4, 48, 81, 97, 113, 122, 175, 202, 217; pigment yellows (PY) 2, 7, 53, 111, 155, 151, 175, 194; pigment blacks 7, carbon black, graphite; pigment white titanium dioxide, etc. Pigments listed here are all commercially available from different companies, such as, SUN CHEMICAL Corporation, NOVATIS, Clariant Corporation, AZTECH (Uhlich Color Company, Inc.), DEGUSSA Corporation, BASF, and Hoechst, etc. Preferably, the mill base prepared in accordance with embodiments of the present invention may comprise about 0.2 to 90% of pigment by weight. This range was selected according to recommendations printed in the "Solsperse hyperdispersants" series, published by Zeneca United Color Technology, Inc. Weight percentage of a pigment in the ink formulation depends usually on the nature of the pigment.

For the purpose of embodiments of the present invention, a solvent may be any liquid organic solvent or oil which provides a wetting and dispersing media for the pigments used in the ink of embodiments of the present invention. Examples of possible liquid organic solvents include, but are not limited to, an aromatic processed synthetic and aliphatic liquid organic solvent, alcohol, glycol, ether, ester, and the like. Any organic solvent which is thermally stable, has good wetting properties, and is compatible with the other components of the ink, can be used. Oils can include, but not limited to, natural processed, synthetic and mineral oils, castor oil, linseed oil, lauric oil, palm oil, dehydrated castor oil, tung oil, oiticica oil, vegetable oils and the like. Preferably, a mill base comprises about 9 to 98.590 of solvent by weight. The range selection was based on experimental results and recommendations published in the "Solsperse hyperdispersants" series published by Zeneca, United Color Technology, Inc. Each pigment requires its own individual amount of solvent, which is dictated by the pigment's surface and wetting properties. The amount of solvent has to be close to the critical pigment volume concentration (CPVC), see: Temple C. Patton, "Paint Flow and Pigment Dispersion. A Rheological Approach to Coating and Ink Technology." Second edition, (John Wiley & Sons, 1979).

In embodiments of the present invention, a mill base may contain about 1 to 40% of a dispersing agent. The range selection was based on experimental results and recommendations published in the "Solsperse hyperdispersants" series published by Zeneca, United Color Technology, Inc. Usually, a dispersion with an optimal concentration of a dispersing agent shows minimal viscosity (see FIG. 1). Examples of possible dispersing agents include, but are not limited to, Solsperse 24000, Solsperse 20000, Solsperse 17000, 13940, 13240, 24000, 26000, 28000 and the like. Selection of a particular Solsperse dispersant depends on the selected solvent, such as liquid organic solvent/oil or the like. The recommendations on Solsperse selections are published by Zeneca United Color Technology, Inc.

In embodiments of the present invention, a mill base may also contain a synergist. The ratio of synergist should be determined experimentally, but guideline ratios can be found in the typical formulations recommended by Zeneca United Color Technology, Inc. Preferably, the ratio between the dispersing agent and synergist varies from 4:1 to 9:1. For example, the best results were obtained for PY155 with 0.2% of Solsperse 22000, and for PB 15:4 with 0.94% of Solsperse 5000 in the mill base. Examples of such synergists include, but are not limited to, Solsperse 5000, Solsperse 22000, and the like.

In one aspect of the present invention, the step of preparing an ink from the mill base further includes the steps of preparing a color concentrate from the mill base, and preparing an ink from the color concentrate.

In embodiments of the present invention, a color concentrate may be prepared by diluting or letting down the mill base with a solid plasticizer and/or waxes, and resins. Examples of possible solid plasticizers include, but are not limited to, glyceryl tribenzoate (also known as Benzoflex S-404 or Uniplex 260), 1,4-cyclohexane dimethanol dibenzoate (also known as Benzoflex 352), triphenyl phosphate and the like. Depending on the selected pigment and solvent, a color concentrate contains about 0 to 85% of plasticizer. This range was established experimentally and is different for different pigments. Mill base materials and the final properties of the ink also determine whether a plasticizer needs to be added and how much of the plasticizer is needed. For example, in certain cases for pigment blue 15:4, the optimal concentration of solid plasticizer was 60–80%, for pigment yellow 155, it was 79%, for pigment red 122, 81–84%. The addition of plasticizer at this stage of ink formation is important for reducing viscosity of mill base to remove media and to permit filtering of the mill base. There are also cases where no plasticizer was used. Generally, the amount of pigment in the color concentrate should be 2–3 times higher than its amount in the final inks.

Depending on the selected pigment and the solvent, a color concentrate contains about 0 to 90% of wax. Examples of possible waxes include, but are not limited to, synthetic and natural waxes hydrogenated castor oil, castor wax, ester waxes, amide waxes, acid waxes, polyethylene waxes, montan waxes, glycerol esters, fatty alcohols, polyol esters, ethoxylated alcohols, maleic anhydride, and oxidized hydrocarbons and the like. Mill base materials and the type of wax determine how much wax needs to be added. The amount of wax needs to be sufficient to provide smooth filtration operation. It was also seen that the amount and type of wax can affect the final ink stability. The optimal concentration of the wax, for the oil based system was experimentally found to be 84–88% for pigment red 122, pigment blue 15:4, and pigment yellow 155.

For the purpose of embodiments of present invention, resins used herein may be acrylic, hydrocarbon resins, aliphatic resins, rosin esters, polyamides and the like. Examples of possible acrylic resins include, but are not limited to, Jonrez IM-834 (from Westvaco) and the like. Examples of possible aliphatic resins include, but are not limited to DP-7504-30, DP-7504-52 (from Westvaco) and the like. Examples of possible hydrocarbon resins include, but are not limited to E90, M100, P70, Escorez 5300, 5380 (from Arakawa, S&S Chemical, Exxon) and the like. Preferably, a color concentrate contains about 0 to 25% of the resin. This range was established experimentally. For example, it was found that addition of resin to the glyceryl tribenzoate based inks decreases viscosity of the inks and makes their rheology more Newtonian. With the increase in the amount of resin, viscosity of ink decreases, reaches a minimal value and then increases. This is an important point for optimizing of the resin concentration of the final ink. In particular compositions, the pigment blue 15:4 containing color concentrate included 25% of the resin (DP-7504-30 or IM-834, both from "Westvaco," DP-7504-30 is a hydrocarbon resin, IM-834 is acrylic), the pigment yellow 155 color concentrate contained 9–15% of IM-834, and pigment red 122 color concentrate contained 9–11% of DP-7504-52 or IM-834, both from "Westvaco" (DP-7504-52 is hydrocarbon resin). In certain cases resin can be added at a later stage. In some oil based systems, the resin was added in the final stage of ink preparation, as is shown in the tables 2.4 and 2.5.

In a preferred embodiment, a color concentrate may contain about 10 to 35%, and preferably 10 to 17% of a mill base made in accordance with embodiments of the present invention. This range is found experimentally, where the viscosity of color concentrate was low enough for filtration and media separation. The amount of pigment in the color concentrate has to be higher than in final inks. For example for pigment red 122 the optimal concentration of the mill base in color concentrate was 10–14%, for pigment yellow 155 it was 10–12%, and for pigment blue 15:4 it was 14–16%.

In accordance with embodiments of the present invention, inks may be prepared from a color concentrate. The inks may be prepared from a color concentrate by mixing the color concentrate with other ingredients such as, but not limited to, plasticizers, waxes, and resins. The color concentrate may be diluted with a plasticizer. Examples of possible plasticizers include, but are not limited to 1, 4-cyclohexane dimethanol dibenzoate (also known as Benzoflex 352) or the like. Preferably, color concentrate is diluted with about 40 to 50% of plasticizer by weight. This range was established experimentally, based on the pigment concentration in the final inks, and their viscosity and drying characteristics.

In other embodiments of the present invention, the color concentrate may also be diluted with waxes. The color concentrate is diluted with 0.90 to 95%, and preferably with 30 to 85% of waxes, including, but not limited to, synthetic and natural waxes, Castor wax, ester waxes including polyol esters and glycerol esters, amide waxes (e.g., Kemamide B), acid waxes, polyethylene waxes, montan waxes, fatty alcohols, ethoxylated alcohols, oxidized hydrocarbons and the like. Depending on formulation, the amount of waxes in finished inks may vary in a broad percentage range. For example, in one embodiment of the present invention, the color concentrate is about 10% to 60% by weight, the plasticizer is about 0 to 85% by weight, the wax is 0.5 to 85% by weight, and the resin is about 0 to 20% by weight.

It should be understood that other suitable materials for embodiments of the present invention are commercially available and would be known to those of ordinary skill in the art in view of this disclosure.

Another embodiment of the present invention provides a hot melt pigmented ink that includes a pigment, a solvent, such as a liquid organic solvent or an oil, as a wetting and dispersing media for the pigment, and in certain cases a plasticizer as a part of a hot melt vehicle.

For the purpose of embodiments of the present invention, a pigment may be either an organic or an inorganic pigment. Preferably, the pigments are heat and light resistant. Examples of pigments include, but are not limited to, pigment blues (PB) 15, 15:3, 15:4, 16, 22, 28, 64, 68; pigment reds (PR) 3, 4, 48, 81, 97, 113, 122, 175, 202, 217; pigment yellows (PY) 2, 7, 53, 111, 155, 151, 175, 194; pigment blacks 7, carbon black, graphite; pigment white titanium dioxide, and the like. However, other suitable pigments may also be used and would be known to those of ordinary skill in the art in view of this disclosure.

For the purpose of embodiments of the present invention, a solvent may be any liquid organic solvent and/or oil which provides a wetting and dispersion media for pigments used in the inks in accordance with embodiments of the present invention. Examples of solvents include, but are not limited to, an aromatic and aliphatic liquid organic solvent, alcohol, glycol, ester, ether, oil and the like. Any organic solvent which is thermally stable, has good wetting properties, and is compatible with the other components of the hot melt vehicle can be used. The oils include but are not limited to natural and mineral oils, castor oil, linseed oil, lauric oil, palm oil, dehydrated castor oil, tung oil, oiticica oil, vegetable oils and the like. However, other suitable solvents may also be used and would be known to those of ordinary skill in the art in view of this disclosure. In addition, the plasticizer may be benzoates (e.g., glyceryl tribenzoate (also known as Benzoflex 404, Uniplex 260), 1,4-cyclohexane dimethanol dibenzoate (also known as Benzoflex 352)), phosphates (e.g., triphenyl phosphate), phthalates, abietates, sebacates and the like. Plasticizers are commercially available from Velsicol Chem. Corp., Solutia Inc., Monsanto, Unitex Chem. Corp.

In one embodiment of the present invention, a hot melt pigmented ink may also include a resin. Preferably, the resin is an acrylic, aliphatic, hydrocarbon resin, rosin esters and the like. Examples of possible acrylic resins include, but are not limited to Jonrez IM-834 (from Westvaco). Examples of possible aliphatic resins include, but are not limited to, DP-7504-30, DP-7504-52 (from Westvaco) and the like. Examples of possible hydrocarbon resins include, but are not limited to E90, M100, P70, Escorez 5300, 5380 (from Arakawa, S&S Chemical, Exxon companies), and the like. However, other suitable resins may also be used and would be known to those of ordinary skill in the art in view of this disclosure.

In an embodiment of the present invention, a hot melt pigmented ink may also include wax. Examples of possible waxes include, but are not limited to, synthetic and natural waxes, Castor wax, ester waxes including polyol esters and glycerol esters, amide waxes, acid waxes, polyethylene waxes, montan waxes, fatty alcohols, ethoxylated alcohols, oxidized hydrocarbons and the like. Preferably, the wax is Castor wax, Kemamide B, polyol esters, synthetic waxes, Glycolube TS, Glycolube 674, Glycolube P. Castor wax is available from CasChem, Inc., and Clycolube TS, Glycolube P, and Glycolube 674 are available from Lonza. However, other suitable waxes may also be used and would be known to those of ordinary skill in the art in view of this disclosure. Of course, the amount of waxes, plasticizers and resin may vary in a broad percentage range. For example, in one embodiment of the present invention, the mill base comprises about 1 to 50% by weight, the plasticizer is about 0 to 81% by weight, the wax is 0 to 95% by weight and the resin is about 0 to 10% by weight.

The processes used in embodiments of the present invention provide a number of advantages. It has been found that the processes enhance the marketability of hot melt pigmented inks. First, due to milling in solvents instead of waxes, it is possible to decrease the milling time down to 0.5 to 1 hour. Conversely, dispersing of pigments in waxes using an attritor-mill may take more than 10 hours or not be successful at all. Also, introducing solvents allows the use of relatively inexpensive milling equipment. Moreover, inks produced in accordance with embodiments of the present invention show excellent light fastness, and reliable printing and jetting properties. The processing is carried out in an attritor mill. However, in alternative embodiments, other mills, known to those of ordinary skill in the art, may be used.

EXAMPLE I

Examples of the compositions of mill bases in accordance with embodiments of the present invention are summarized in Tables 1.1–1.6.

TABLE 1.1

| INGREDIENTS | % BY WEIGHT |
| --- | --- |
| Pigment red 122 | 20 |
| Solsperse 24000 | 3.20 |
| Benzyl Alcohol | 38.4 |
| Glyceryl Tribenzoate | 38.4 |

TABLE 1.2

| INGREDIENTS | % BY WEIGHT |
| --- | --- |
| Pigment yellow 155 | 50 |
| Solsperse 24000 | 1.80 |
| Solsperse 22000 (synergist) | 0.2 |
| Benzyl Alcohol | 43 |
| Glyceryl Tribenzoate | 5 |

TABLE 1.3

| INGREDIENTS | % BY WEIGHT |
| --- | --- |
| Pigment blue 15:4 | 30 |
| Solsperse 24000 | 3.76 |
| Solsperse 5000 (synergist) | 0.94 |
| Benzyl Alcohol | 26 |
| Glyceryl Tribenzoate | 39.3 |

TABLE 1.4

| INGREDIENTS | % BY WEIGHT |
| --- | --- |
| Pigment red 122 | 19.14 |
| Solsperse 13940 | 7.18 |
| Castor Oil | 73.68 |

TABLE 1.5

| INGREDIENTS | % BY WEIGHT |
| --- | --- |
| Pigment yellow 155 | 20 |
| Solsperse 13940 | 5 |
| Solsperse 22000 (synergist) | 0.5 |
| Castor Oil | 74.5 |

TABLE 1.6

| INGREDIENTS | % BY WEIGHT |
| --- | --- |
| Pigment blue 15:4 | 25 |
| Solsperse 13940 | 11.63 |
| Solsperse 5000 (synergist) | 0.78 |
| Castor Oil | 62.59 |

TABLE 2.1

| INGREDIENTS | % BY WEIGHT |
| --- | --- |
| Color concentrate containing Pigment red 122 | 49.67 |
| Benzoflex 352 | 49.67 |
| Kemamide B | 0.66 |

TABLE 2.2

| INGREDIENTS | % BY WEIGHT |
| --- | --- |
| Color concentrate containing Pigment blue 15:4 | 50 |
| Castor wax | 37.5 |
| Kemamide B | 12.5 |

TABLE 2.3

| INGREDIENTS | % BY WEIGHT |
| --- | --- |
| Color concentrate containing Pigment yellow 155 | 60 |
| Castor wax | 35 |
| Kemamide B | 5 |

TABLE 2.4

| INGREDIENTS | % BY WEIGHT |
| --- | --- |
| Color concentrate containing Pigment blue 15:4 | 36.97 |
| Castor wax | 38.03 |
| Polyol ester (Glycolube 674) | 20 |
| Hydrogenated Aromatic C9 Resin | 5 |

TABLE 2.5

| INGREDIENTS | % BY WEIGHT |
| --- | --- |
| Color concentrate containing Pigment red 122 | 46.67 |
| Castor wax | 28.33 |
| Synthetic wax (Glycolube TS) | 20 |
| Hydrogenated Aromatic C9 Resin | 5 |

TABLE 2.6

| INGREDIENTS | % BY WEIGHT |
| --- | --- |
| Color concentrate containing Pigment yellow 155 | 46.3 |
| Glyceryl tribenzoate | 53.7 |

Properties of Inks

Figure 2A:
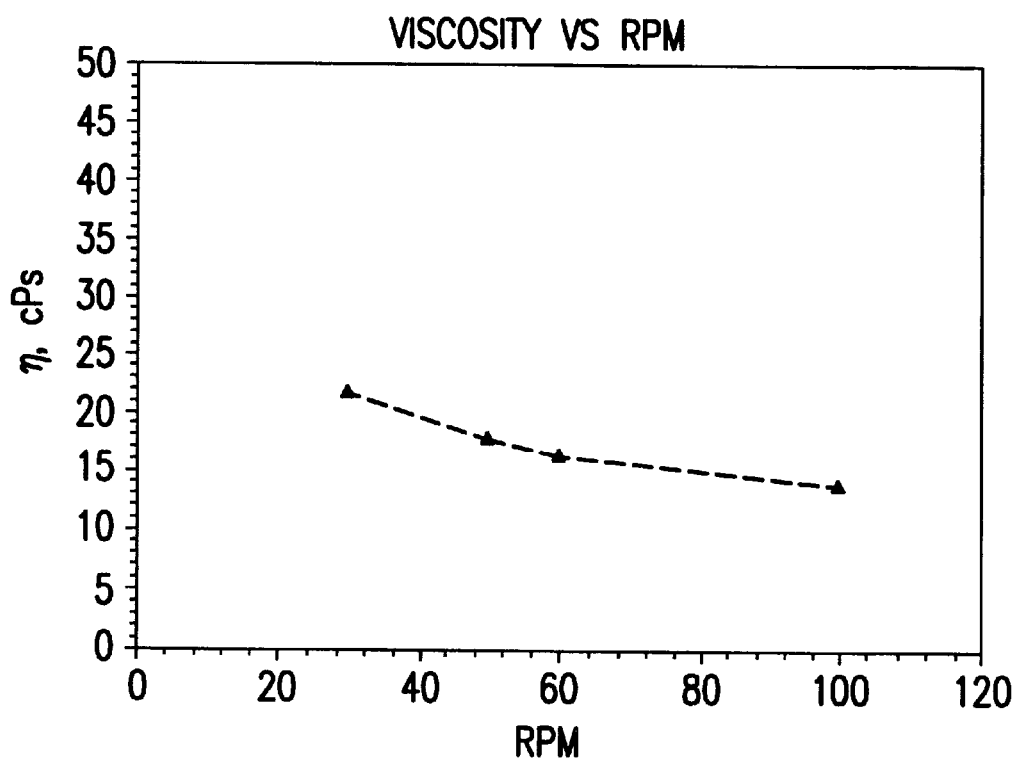
FIGS. 2(*a*)–(*f*) show dependence of ink viscosity based on rotation speed at a temperature of T=130° C.
Figure 2B:
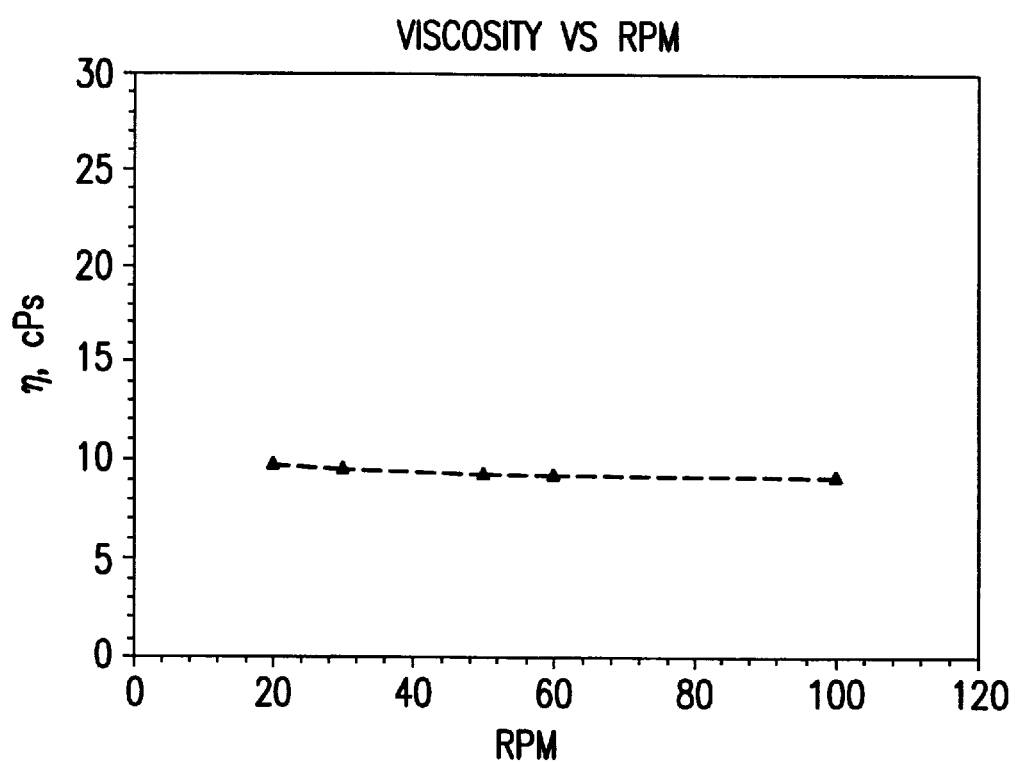
Figure 2C:
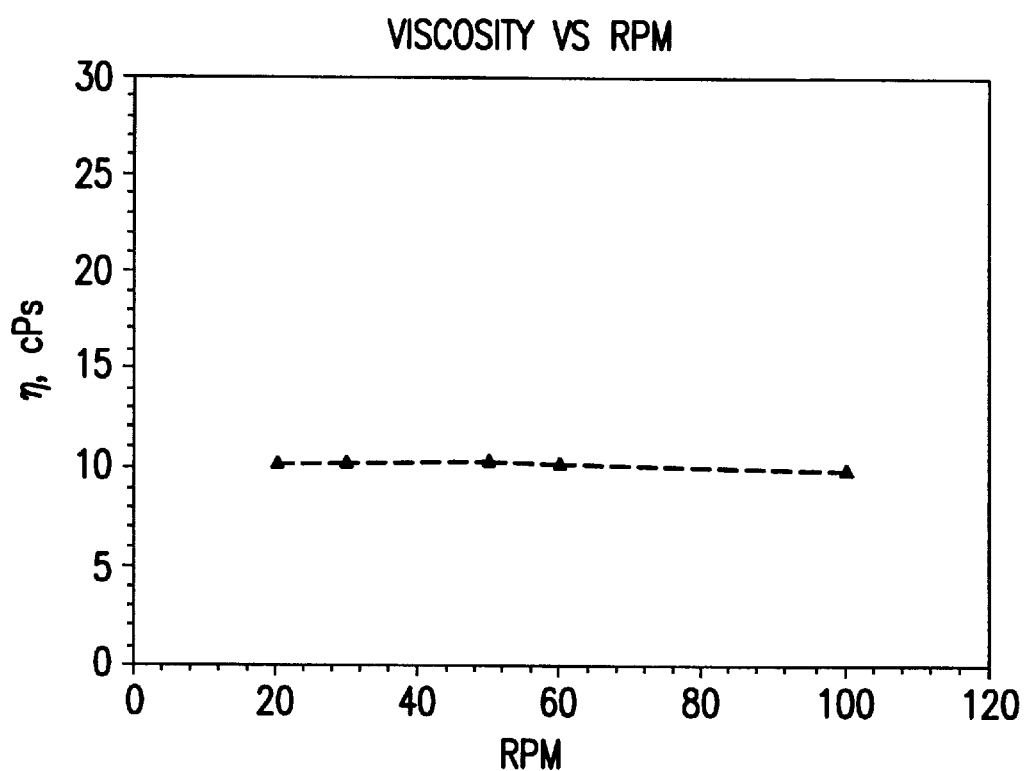
Figure 2D:
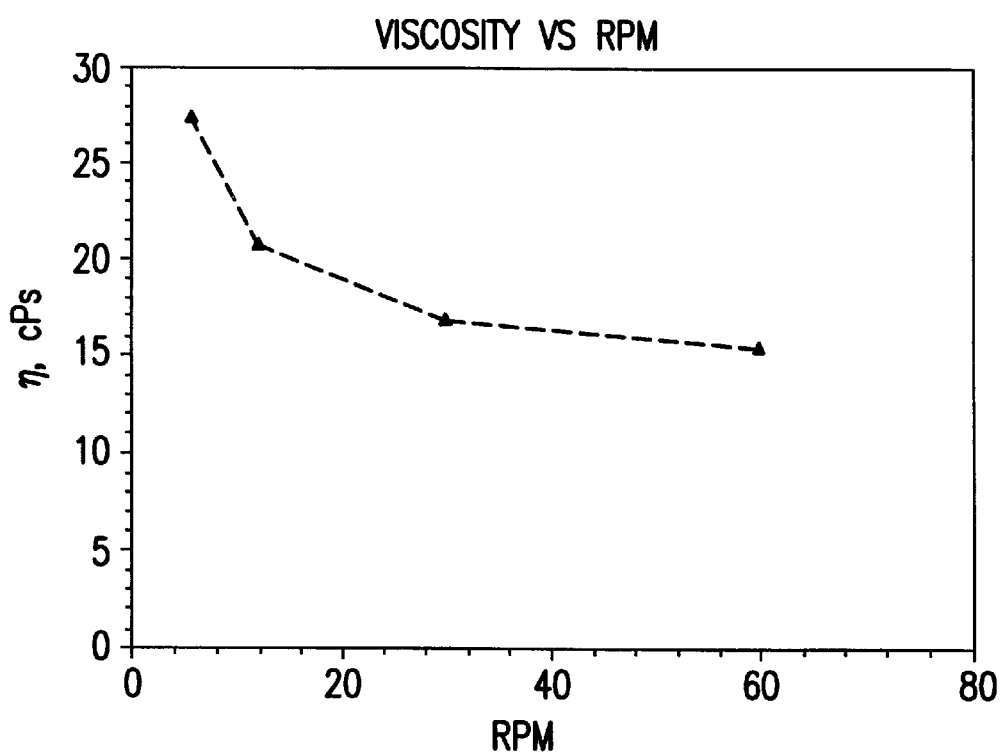
Figure 2E:
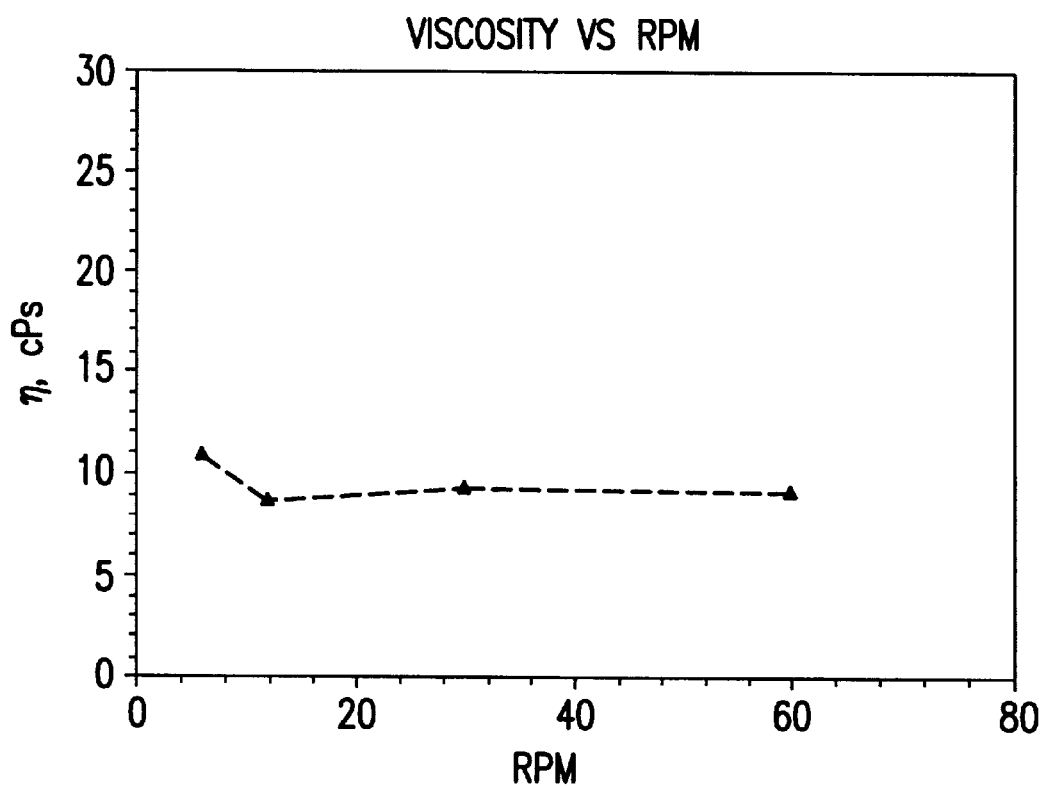
Figure 2F:
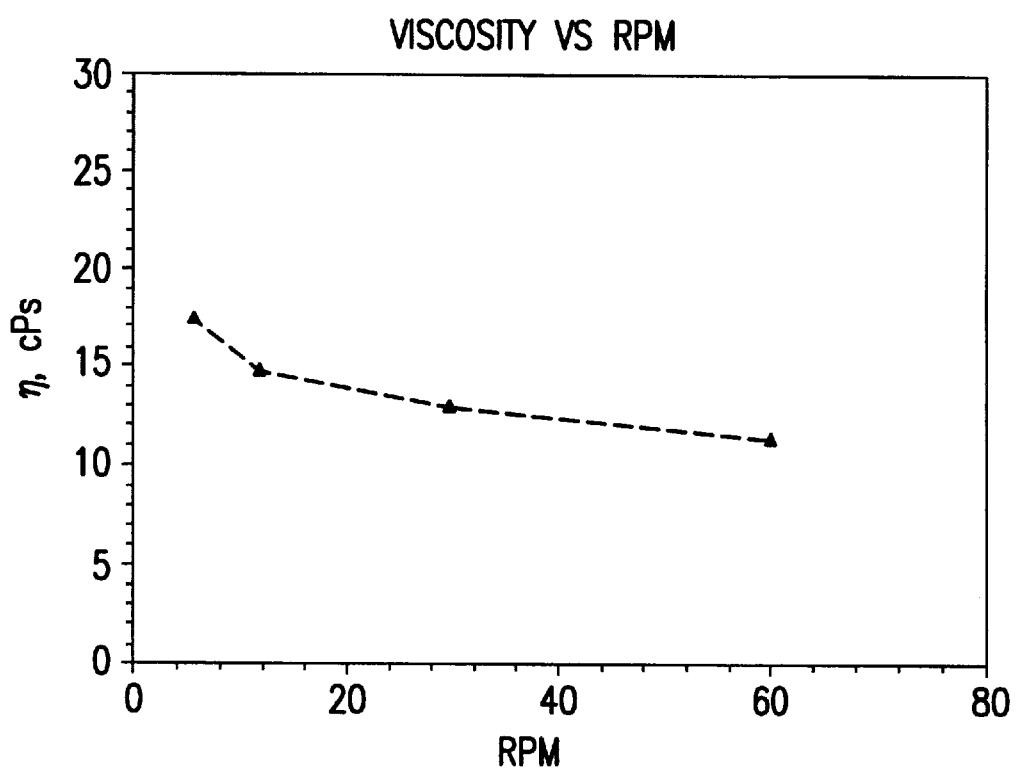

1. Rheology:

The ink obtained in the above-process showed a slightly non-Newtonian behavior, and the shear stress was not linear vs. shear rate, which is typical for dispersions. (See: Temple C. Patton, "Paint Flow and Pigment Dispersion. A Rheological Approach to Coating and Ink Technology." Second edition, John Wiley & Sons, 1979). Viscosity was measured as a function of a rotation speed as evidenced in FIGS. 2(a)–(f). To measure viscosity a BROOKFIELD DV-II rheometer was used. It consists essentially of two concentric cylinders with the space between them filled with liquid ink under investigation. One of cylinders is made to rotate with a constant angular velocity. By measuring the torque necessary to maintain this rotation and the dimensions of the cylinders, a viscosity value for the test liquid can be calculated. FIGS. 2(a)–(f) show the dependence of the viscosity of various inks based on the rotation speed at a temperature of 130° C. FIG. 2(a) shows Magenta (Pigment Red 122 based) ink (corresponding to Table 2.1); FIG. 2(b) shows Yellow (Pigment Yellow 155 based) ink (corresponding to Table 2.3); FIG. 2(c) shows Cyan (Pigment Blue 15:4 based) ink (corresponding to Table 2.2); FIG. 2(d) shows Magenta (Pigment Red 122 based) ink (corresponding to Table 2.5); FIG. 2(e) shows Cyan (Pigment Blue 15:4 based) ink (corresponding to Table 2.4); and FIG. 2(f) shows Yellow (Pigment Yellow 155 based) ink (corresponding to Table 2.6).

Figure 3A:
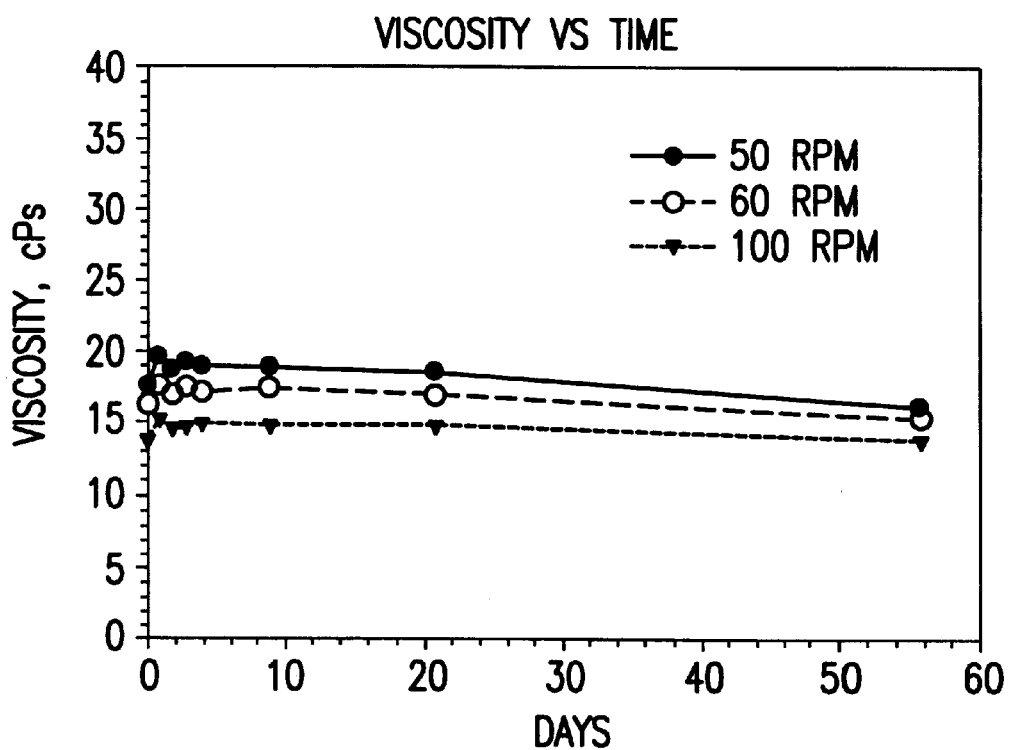
FIGS. 3(*a*) and (*b*) show time induced changes of viscosity in magenta ink at a temperature of T=105° C.
Figure 3B:
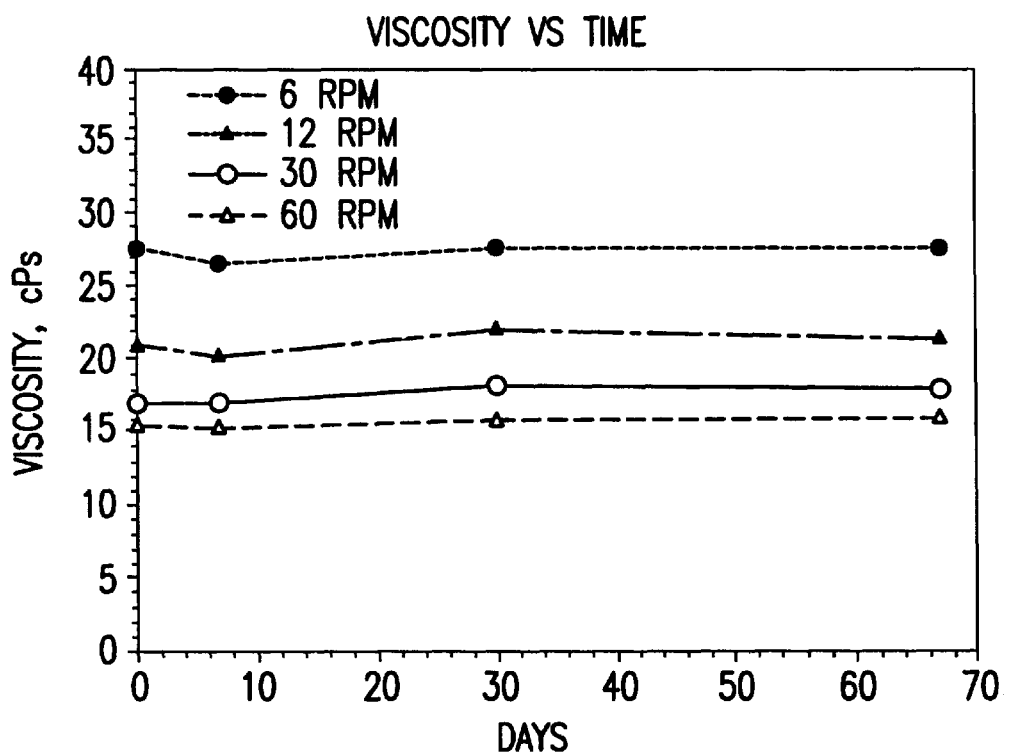

FIGS. 3(a) and (b) show the time induced changes of viscosity in the magenta ink at a temperature of 105° C. FIG. 3(a) corresponds to Table 2.1 and shows that after 56 days, changes of viscosity were below 8%. FIG. 3(b) corresponds to Table 2.5 and shows that in this system changes of viscosity after 68 days in the oven, were below 2.5%.

Figure 4A:
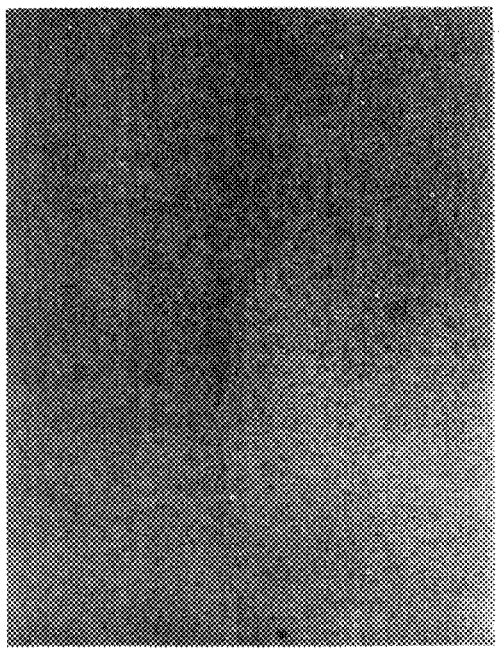
FIGS. 4(*a*)–(*c*) show microscope images of the different inks.
Figure 4B:
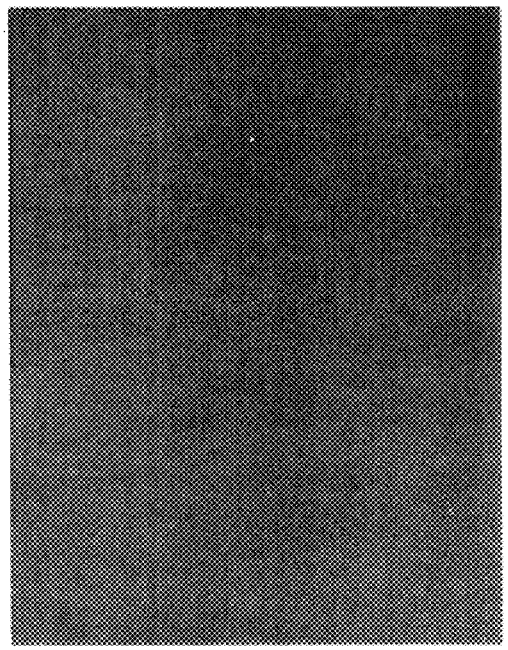
Figure 4C:
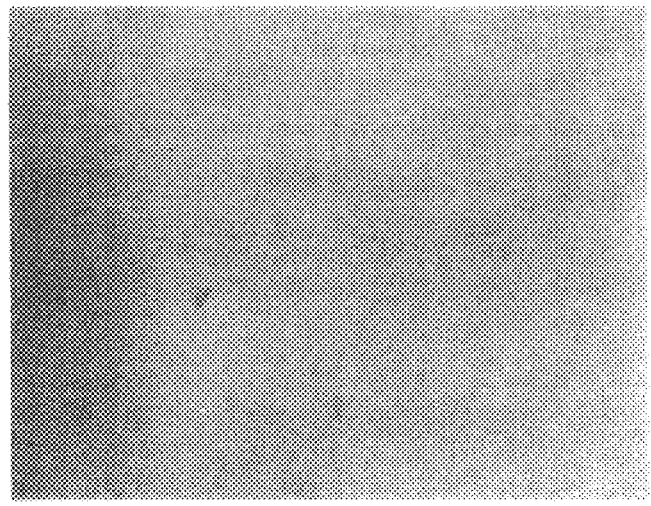

2. Particle Size Analysis:

To maintain a stable dispersion it is important to have a small particle size and a narrow particle size distribution. The average size of the pigment particles depended on the particular ink composition. For example, for Pigment Red 122 ink, it was in the range of 200 to 300 nm with a standard deviation 40 to 70 nm, for Pigment Blue 15:4 ink, the particles generally did not exceed 200 nm and the standard deviation did not exceed 90 nm. Particle size analysis was performed with a N4 Plus Coulter Particle Size Analyzer and measurements were taken in liquid organic solvents. Ink dispersions were monitored using an OLYMPUS CH-2 microscope with 500× magnification. FIGS. 4(a)–(c) show microscope images of different inks. FIG. 4(a) shows magenta ink (Pigment Red 122); FIG. 4(b) shows cyan ink (Pigment Blue 15:4); and FIG. 4(c) shows yellow ink (Pigment Yellow 155).

Figure 5:
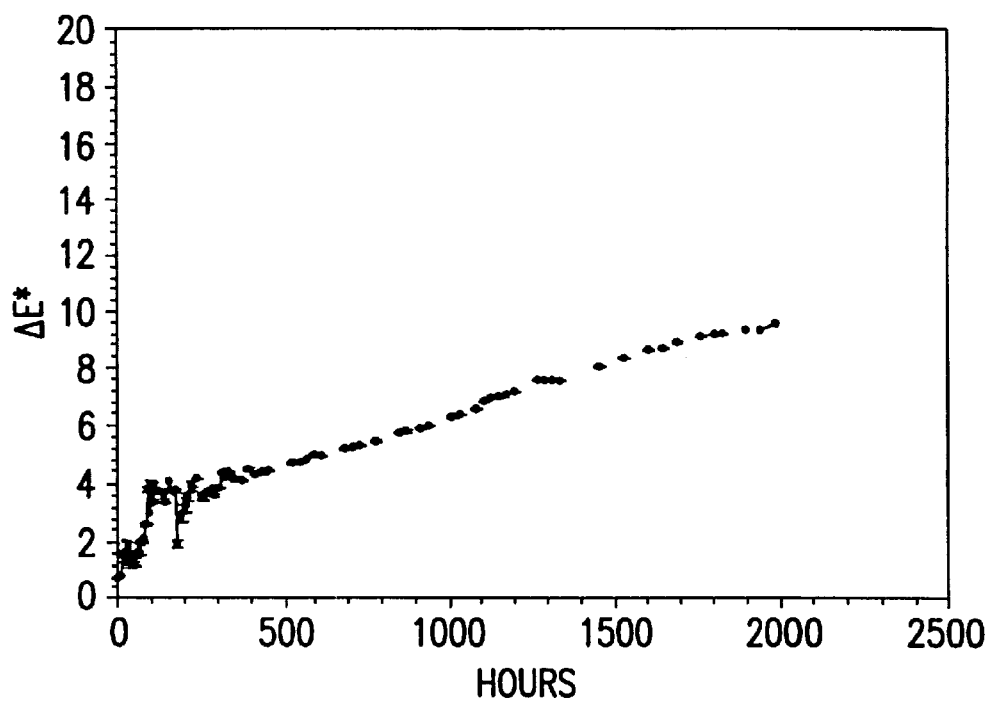
FIG. 5 shows the behavior of magenta (pigment red 122) based ink during irradiation (corresponding to Table 2.1).

3. Light Fastness:

The irradiation characteristics of embodiments of the ink after exposure to a 750 W/m$^2$ Xenon lamp source are shown in FIG. 5. ΔE* stands for color difference between the standard and sample. Irradiation was performed using 750 W/m$^2$ xenon lamp from ATLAS ELECTRIC DEVICES COMPANY and the test was carried out at a temperature of 50° C. Under these conditions, approximately 4.2 hours of irradiation is comparable to one day exposure to the sun in Arizona (See ATLAS DSET Laboratory Data and ATLAS Material Testing Products and Technology News, V. 26(54), 1996). Color changes (ΔE*) measurements were done using the MILTON ROY Color Graph device with a D65b illuminant and a 10-degree observer. Irradiation of magenta (Pigment Red 122 based) ink continued for 2000 hours, yielding an obtained light dose that was approximately equal to 1.3 years in Arizona. After irradiation, the ΔE* value for the magenta ink was 9.6. Color changes (ΔE*) of cyan (Pigment Blue 15:4 based) ink did not exceed 5.1 after 708 hours of irradiation.

While the description of the above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description and all changes which come within the meaning and range of equivalency of the claims are therefore intended to be embraced therein.

What is claimed is:

1. A process for the preparation of pigmented solid inks comprising the steps of:
   (a) combining a pigment and a liquid solvent to form a pigment solution, wherein the liquid solvent is a wetting and dispersing media for the pigment;
   (b) combining the pigment solution with a plasticizer to form a mill base;
   (c) preparing a color concentrate from the mill base; and
   (d) preparing an ink from the color concentrate.

2. The process of claim 1, wherein the plasticizer is selected from the group consisting of benzoates, phosphates, phthalates, abietates and sebacates.

3. The process of claim 1, wherein the pigment is selected from the group consisting of organic and inorganic pigments.

4. The process of claim 3, wherein the pigment is selected from the group consisting of pigment blues 15, 15:3, 15:4, 16, 22, 28, 64, 68; pigment reds 3, 4, 48, 81, 97, 113, 122, 168, 175, 202, 217; pigment yellows 2, 7, 53, 111, 155, 151, 175, 194; pigment blacks 7, carbon black, graphite, and titanium dioxide.

5. The process of claim 1, wherein the solvent is selected from the group consisting of liquid organic solvents and oils.

6. The process of claim 1, wherein the solvent is selected from the group consisting of alcohols, glycols, ethers, esters, oils, and aromatic and aliphatic liquid organic solvents.

7. The process of claim 1, wherein the solvent is an oil that is selected from the group consisting of castor oil, linseed oil, lauric oil, palm oil, dehydrated castor oil, tung oil, oiticica oil vegetable oils, and natural, processed, and synthetic mineral oils.

8. The process of claim 1, wherein the mill base further includes a dispersing agent.

9. The process of claim 8, wherein the dispersing agent is selected from the group consisting of a solid dispersing agent having a basic and cationic anchor group, a solid dispersing agent having an acidic and anionic anchor group, a liquid polymeric condensate having polyester and polyamine groups and a basic and cationic anchor group, a polymeric condensate, a condensation polymer having fatty acid groups, and an oxylated amino alcohol.

10. The process of claim 1, wherein the mill base further comprises a synergist.

11. The process of claim 10, wherein the synergist is selected from the group consisting of a copper Phthalocyanine Blue derivative and a Diarylide Yellow derivative.

12. The process of claim 1, wherein the mill base comprises about 0 to 40% by weight of the plasticizer.

13. The process of claim 1, wherein the mill base comprises about 1 to 90% by weight of the pigment.

14. The process of claim 1, wherein the mill base comprises about 9 to 98.5% by weight of the solvent.

15. The process of claim 8, wherein the mill base comprises about 1 to 32% by weight of the dispersing agent.

16. The process of claim 1, wherein the color concentrate is prepared by diluting the mill base with a material selected from the group consisting of a plasticizer, wax, and resin.

17. The process of claim 16, wherein the plasticizer is selected from the group consisting of glyceryl tribenzoate, 1,4-cyclohexane dimenthanol dibenzoate and triphenyl phosphate.

18. The process of claim 16, wherein the wax is selected from the group consisting of synthetic wax, natural wax, hydrogenated castor oil, an amide, esters of polyhydric alcohols, polyethylene wax, montan wax, fatty alcohol, ethoxylated alcohol, oxidized hydrocarbon, and high molecular weight steric, palmitic, and myristic acids.

19. The process of claim 16, wherein the resin is an aliphatic modified resin.

20. The process of claim 16, wherein the mill base is about 1 to 50% by weight, the plasticizer is about 0 to 81% by weight, the wax is 0 to 95% by weight, and the resin is about 0 to 10% by weight.

21. The process of claim 1, wherein the ink is prepared by diluting the color concentrate with a material selected from the group consisting of a plasticizer, wax and resin.

22. The process of claim 21, wherein the plasticizer has a high melt point.

23. The process of claim 22, wherein the plasticizer is 1,4-cyclohexane dimethanol dibenzoate.

24. The process of claim 21, wherein the wax is selected from the group consisting of hydrogenated castor oil, behenamide, a polyol ester, and a synthetic wax.

25. The process of claim 21, wherein the color concentrate is about 10% to 60% by weight, the plasticizer is about 0 to 85% by weight, and the wax is about 0.5 to 85% by weight, and the resin is about 0 to 20% by weight.

26. The process of claim 16, wherein the acrylic resin is a carboxylic acid ester.

27. The process of claim 1, further including the steps of:
preparing a mill base, the mill base comprising, by weight, 0.2–90% pigment, 0–85% plasticizer, and 9–84% solvent, wherein the solvent is a wetting and dispersing media for the pigment;
preparing a color concentrate from the mill base by diluting the mill base with at least one compound selected from the group consisting of a plasticizer, a wax, and a resin; and
preparing an ink from the color concentrate by mixing the color concentrate with at least one compound selected from the group consisting of a plasticizer, a wax, and a resin.

28. A hot melt pigmented ink comprising:
a solution including a pigment, and a liquid solvent being a wetting and dispersing media for the pigment;
a plasticizer as part of a hot melt vehicle, wherein the hot melt pigmented ink is prepared from a color concentrate, and the color concentrate is prepared from a mill base formed by a combination of the solution and the plasticizer.

29. The ink of claim 28, wherein the solvent is selected from the group consisting of liquid organic solvents and oils.

30. The ink of claim 28, wherein the pigment is selected from the group consisting of organic and inorganic pigments.

31. The ink of claim 28, wherein the pigment is selected from the group consisting of pigment blues 15, 15:3, 15:4, 16, 22, 28, 64, 68; pigment reds 3, 4, 48, 81, 97, 113, 122, 168, 175, 202, 217; pigment yellows 2, 7, 53, 111, 155, 151, 175, 194; pigment blacks 7, carbon black, graphite, and titanium dioxide.

32. The ink of claim 28, wherein the plasticizer is selected from the group consisting of benzoate plasticizers, glyceryl tribenzoate, and 1,4-cyclohexane dimethanol dibenzoate.

33. The ink of claim 28, wherein the solvent is selected from the group consisting of alcohols, glycols, ethers, esters, and aromatic and aliphatic solvents.

34. The ink of claim 28, wherein the solvent is selected from the group consisting of natural, processed, synthetic, and mineral oils, castor oil, linseed oil, lauric oil, palm oil, dehydrated castor oil, tung oil, oiticica oil and vegetable oils.

35. The ink of claims 28, further including a resin.

36. The ink of claim 35, wherein the resin is selected from the group consisting of acrylic resins, hydrocarbon resins, aliphatic resins and rosin esters.

37. The ink of claim 35, wherein the resin is a modified acrylic polymer.

38. The ink of claim 35, wherein the resin is an aliphatic modified resin.

39. The ink of claim 35, wherein the resin is a hydrogenated aromatic C-9 hydrocarbon resin.

40. The ink of claim 30, further comprising a wax.

41. The ink of claim 40, wherein the wax is selected from the group consisting of hydroxy waxes, synthetic waxes, polyol ester and amide waxes.

42. The ink of claim 28, wherein
the solution comprises, by weight, 0.2–90% pigment, 0–85% plasticizer, and 9–84% solvent,
the color concentrate comprises at least one compound selected from the group consisting of a plasticizer, a wax, and a resin; and
the ink further comprises at least one compound selected from the group consisting of a wax and plasticizer.

* * * * *